United States Patent
Joshi et al.

(10) Patent No.: US 11,002,974 B2
(45) Date of Patent: May 11, 2021

(54) SYSTEM AND METHOD OF CUSTOMIZING A USER INTERFACE PANEL BASED ON USER'S PHYSICAL SIZES

(71) Applicant: Tencent Technology (Shenzhen) Company Limited, Shenzhen (CN)

(72) Inventors: Dhaval Jitendra Joshi, Shenzhen (CN); Xiaomei Chen, Shenzhen (CN); Wenjie Wu, Shenzhen (CN); Jingzhou Chen, Shenzhen (CN); Wei Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/543,292

(22) Filed: Aug. 16, 2019

(65) Prior Publication Data
US 2019/0369404 A1 Dec. 5, 2019

Related U.S. Application Data

(63) Continuation of application No. PCT/CN2017/088518, filed on Jun. 15, 2017.

(51) Int. Cl.
*G02B 27/01* (2006.01)
*G06T 7/70* (2017.01)
(Continued)

(52) U.S. Cl.
CPC ..... *G02B 27/0179* (2013.01); *G02B 27/0172* (2013.01); *G06T 7/70* (2017.01);
(Continued)

(58) Field of Classification Search
CPC ...... G06F 3/04815; G06F 3/017; G06F 1/163; G06F 3/012; G06F 3/0484; G06F 3/01;
(Continued)

(56) References Cited

U.S. PATENT DOCUMENTS

2013/0141421 A1  6/2013  Mount et al.
2013/0342572 A1  12/2013  Poulos et al.
(Continued)

FOREIGN PATENT DOCUMENTS

CN  102129638 A  7/2011
CN  104035760 A  9/2014
(Continued)

OTHER PUBLICATIONS

Tencent Technology, IPRP, PCT/CN2017/088518, dated Dec. 17, 2019, 4 pgs.
(Continued)

*Primary Examiner* — Gerald Johnson
(74) *Attorney, Agent, or Firm* — Morgan, Lewis & Bockius LLP

(57) ABSTRACT

A method is performed at a computing system for customizing a user interface panel of a virtual space based on user locations. The computing system is communicatively connected to a head-mounted display wore by a user. The method includes: generating a virtual space including a user interface panel, the user interface panel having a default location in the virtual space; rendering the virtual space in the head-mounted display; measuring the head-mounted display's location in a physical space using a position tracking system adjacent the user; determining the user's location in the virtual space according to the head-mounted display's location in the physical space; and updating the user interface panel's default location in the virtual space in accordance with the user's location in the virtual space.

20 Claims, 9 Drawing Sheets

(51) Int. Cl.
  *H04W 4/029* (2018.01)
  *H04N 13/344* (2018.01)
  *G06T 19/00* (2011.01)
  *H04W 4/021* (2018.01)
(52) U.S. Cl.
  CPC ......... *G06T 19/006* (2013.01); *H04N 13/344* (2018.05); *H04W 4/021* (2013.01); *H04W 4/029* (2018.02); *G02B 2027/0187* (2013.01)
(58) Field of Classification Search
  CPC ... G06F 3/0346; G06F 3/0304; G02B 27/017; G02B 2027/0187; G02B 27/0172; G06T 19/006; H04N 13/344; H04W 4/021
  See application file for complete search history.

(56) References Cited

U.S. PATENT DOCUMENTS

| | | | |
|---|---|---|---|
| 2016/0350972 A1 | 12/2016 | Kauffmann et al. | |
| 2016/0364916 A1* | 12/2016 | Terahata | G06F 3/0346 |
| 2017/0139474 A1 | 5/2017 | Rochford et al. | |
| 2017/0322622 A1* | 11/2017 | Hong | G06F 3/011 |
| 2018/0284914 A1* | 10/2018 | Yanai | G06F 3/04815 |
| 2018/0329603 A1* | 11/2018 | Sawaki | G02B 27/017 |

FOREIGN PATENT DOCUMENTS

| | | |
|---|---|---|
| CN | 105204625 A | 12/2015 |
| CN | 105359063 A | 2/2016 |
| CN | 106095102 A | 11/2016 |
| CN | 106125930 A | 11/2016 |
| CN | 106462231 A | 2/2017 |

OTHER PUBLICATIONS

Tencent Technology, ISRWO, PCT/CN2017/088518, dated Jan. 8, 2018, 6 pgs.
Extended European Search Report, EP17913435.8, dated Jan. 12, 2021, 9 pgs.

* cited by examiner

SYSTEM AND METHOD OF CUSTOMIZING A USER INTERFACE PANEL BASED ON USER'S PHYSICAL SIZES

CROSS-REFERENCE TO RELATED APPLICATIONS

This application is a continuation application of PCT/CN2017/088518, entitled "SYSTEM AND METHOD OF CUSTOMIZING A USER INTERFACE PANEL BASED ON USER'S PHYSICAL SIZES" filed on Jun. 15, 2017, which is incorporated by reference in its entirety.

This application relates to U.S. patent application Ser. No. 16/590,146, entitled "SYSTEM AND METHOD OF CONNECTING TWO DIFFERENT ENVIRONMENTS USING A HUB", which is incorporated by reference in its entirety.

This application relates to U.S. patent application Ser. No. 16/590,140, entitled "SYSTEM AND METHOD OF INSTANTLY PREVIEWING IMMERSIVE CONTENT", which is incorporated by reference in its entirety.

TECHNICAL FIELD

The disclosed implementations relate generally to the field of computer technologies, and in particular, to system and method of customizing a user interface panel of a virtual space based on user locations.

BACKGROUND

Virtual reality (VR) is a computer technology that uses a head-mounted display (HMD) worn by a user, sometimes in combination with a position tracking system surrounding the user in the physical space, to generate realistic images, sounds and other sensations that simulates the user's presence in a virtual environment. A person using virtual reality equipment is able to immerse in the virtual world, and interact with virtual features or items in many ways, including playing games or even conducting surgeries remotely. HMD is often equipped with sensors for collecting data such as the user's position and movement, etc. and transceivers for communicating such data to a computer running a VR system and receiving new instructions and data from the computer so that the HMD can render the instructions and data to the user. Although VR technology has made a lot of progress recently, it is still relatively young and faced with many challenges such as how to customize its operation for different users having different needs, how to create a seamless user experience when the user moves from one application to another application in the virtual world, and how to switch between the real world and the virtual world without adversely affecting the user experience.

SUMMARY

Some objectives of the present application are to address the challenges raised above by presenting a set of solutions to improve a user's overall experience of using a virtual reality system.

According to one aspect of the present application, a method is performed at a computing system for customizing a user interface panel of a virtual space based on user locations. The computing system has one or more processors, memory for storing programs to be executed by the one or more processors and it is communicatively connected to a head-mounted display wore by a user. The method includes the following steps: generating a virtual space including a user interface panel, the user interface panel having a default location in the virtual space; rendering the virtual space in the head-mounted display; measuring the head-mounted display's location in a physical space using a position tracking system adjacent the user; determining the user's location in the virtual space according to the head-mounted display's location in the physical space; and updating the user interface panel's default location in the virtual space in accordance with the user's location in the virtual space.

According to another aspect of the present application, a computing system for customizing a user interface panel of a virtual space based on user locations is communicatively connected to a head-mounted display wore by a user. The computing system includes one or more processors, memory, and a plurality of programs stored in the memory. The plurality of programs, when executed by the one or more processors, cause the computing system to perform one or more operations including: generating a virtual space including a user interface panel, wherein the user interface panel has a default location in the virtual space; rendering the virtual space in the head-mounted display; measuring the head-mounted display's location in a physical space using a position tracking system adjacent the user; determining the user's location in the virtual space according to the head-mounted display's location in the physical space; and updating the user interface panel's default location in the virtual space in accordance with the user's location in the virtual space.

According to yet another aspect of the present application, a non-transitory computer readable storage medium, in connection with a computing system having one or more processors, stores a plurality of programs for customizing a user interface panel of a virtual space based on user locations. The computing system is communicatively connected to a head-mounted display wore by a user. The plurality of programs, when executed by the one or more processors, cause the computing system to perform one or more operations including: generating a virtual space including a user interface panel, wherein the user interface panel has a default location in the virtual space; rendering the virtual space in the head-mounted display; measuring the head-mounted display's location in a physical space using a position tracking system adjacent the user; determining the user's location in the virtual space according to the head-mounted display's location in the physical space; and updating the user interface panel's default location in the virtual space in accordance with the user's location in the virtual space.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Figure 1:
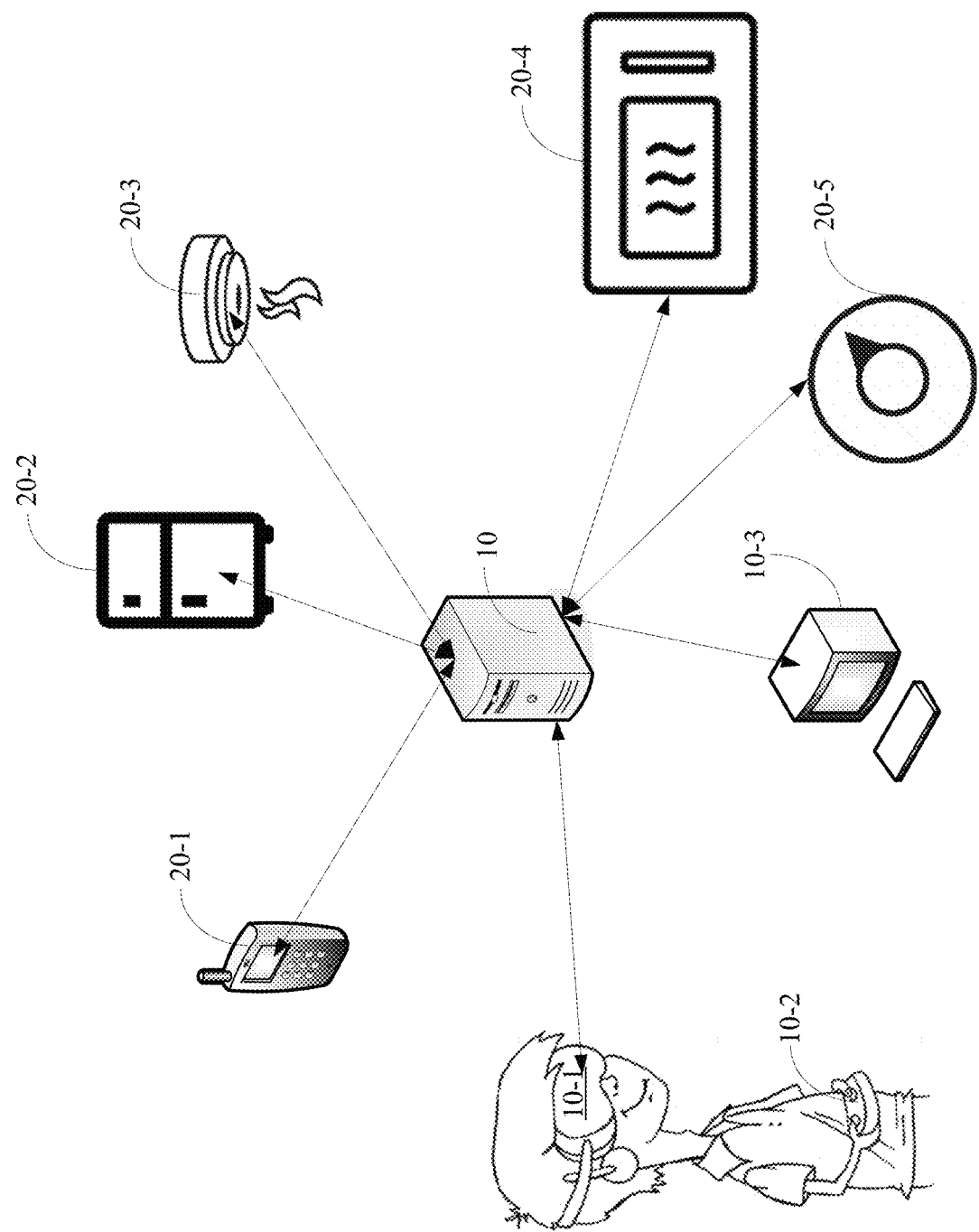
FIG. 1 is a schematic block diagram of a virtual reality environment including a virtual reality system and multiple third-party devices that are communicatively connected to the virtual reality system according to some implementations of the present application.

The description of the following implementations refers to the accompanying drawings, so as to illustrate specific implementations that may be implemented by the present application. Direction terminologies mentioned in the present application, such as "upper", "lower", "front", "rear", "left", "right", "inner", "outer", "side" are only used as reference of the direction of the accompany drawings. Therefore, the used direction terminology is only used to explain and understand the present application, rather than to limit the present application. In the figure, units with similar structures are represented in same reference numerals.

FIG. 1 is a schematic block diagram of a virtual reality environment including a virtual reality system and multiple third-party devices that are communicatively connected to the virtual reality system according to some implementations of the present application. In this example, the virtual reality system includes a computing system 10 that is communicatively connected to a head-mounted display (HMD) 10-1, a hand-held remote control 10-2, and input/output devices 10-3. In some implementations, the HMD 10-1 is connected to the computing system 10 through one or more electrical wires; in some other implementations, the two sides are connected to each other via a wireless communication channel supported by proprietary protocols or standard protocols such as Wi-Fi, Bluetooth, Bluetooth Low Energy (BLE), etc. In some implementations, the computing system 10 is primarily responsible for generating the virtual reality environment including contents rendered in the virtual reality environment and sending data associated with the virtual reality environment to the HMD 10-1 for rendering such environment to a user wearing the HMD 10-1. In some other implementations, the data from the computing system 10 is not fully ready for rendition by the HMD 10-1. Rather, the HMD 10-1 is responsible for further processing the data into something that can be viewed and interacted by the user wearing the HMD 10-1. In other words, the software supporting the present application may be all concentrated at one device (e.g., the computing system 10 or the HMD 10-1) or distributed among multiple pieces of hardware. But one skilled in the art would understand that the subsequent description of the present application is for illustrative purpose only and should not be construed to impose any limitation to the scope of the present application in any manner.

In some implementations, the handheld remote control 10-2 is connected to at least one of the HMD 10-1 and the computing system 10 in a wired or wireless manner. The remote control 10-2 may include one or more sensors for interacting with the HMD 10-1 or the computing system 10, e.g., providing its position and orientation (which are collectively referred to as the location of the remote control 10-2). The user can press buttons on the remote control 10-2 or move the remote control 10-2 in a predefined manner to issue instructions to the computing system 10 or the HMD 10-1 or both. As noted above, the software supporting for the virtual reality system may be distributed among the computing system 10 and the HMD 10-1. Therefore, both hardware may need to know the current location of the remote control 10-2 and maybe its movement pattern for rendering the virtual reality environment correctly. In some other implementations, the remote control 10-2 is directly connected to the computing system 10 or the HMD 10-1, e.g., the HMD 10-1, but not both. In this case, the user instruction entered through the remote control 10-2 is first received by the HMD 10-1 and then forwarded to the computing system 10 via the communication channel between the two sides.

With the arrival of Internet Of Things (IOT), more and more electric devices in a household are connected together. As shown in FIG. 1, the virtual reality system 1 is also communicatively connected to a plurality of third-party devices in the household. For example, the user may choose to connect his/her mobile phone 20-1 or other wearable devices to the computing system 10 so that he will be able to receive incoming calls or messages when playing with the virtual reality system. In some implementations, the computing system 10 is communicatively connected to one or more home appliances in the same household, e.g., refrigerator 20-2, fire or smoke detector 20-3, microwave 20-4, or thermostat 20-5, etc. By connecting these home appliances to the computing system 10, it is possible for the user of the virtual reality system to receive alerts or messages from one or more of these home appliances. For example, the user may play a game using the virtual reality system while using a range to cook food. The range is communicatively connected to the computing system 10 via a short-range wireless connection (e.g., Bluetooth) such that an alert signal is sent to the computing system 10 and rendered to the user through the HMD 10-1 when the cookware on the range is overheated and may cause a potential fire to the household. As will be described below, such capability is especially desired when the virtual reality system is providing more and more near-reality, immersive experience and it is becoming easier and easier for the user to forget his surrounding environment. Although a few third-party devices are depicted in FIG. 1, one skilled in the art would understand that they are only for illustrative purposes and many other third-party devices may be connected to the virtual reality system.

Figure 2:
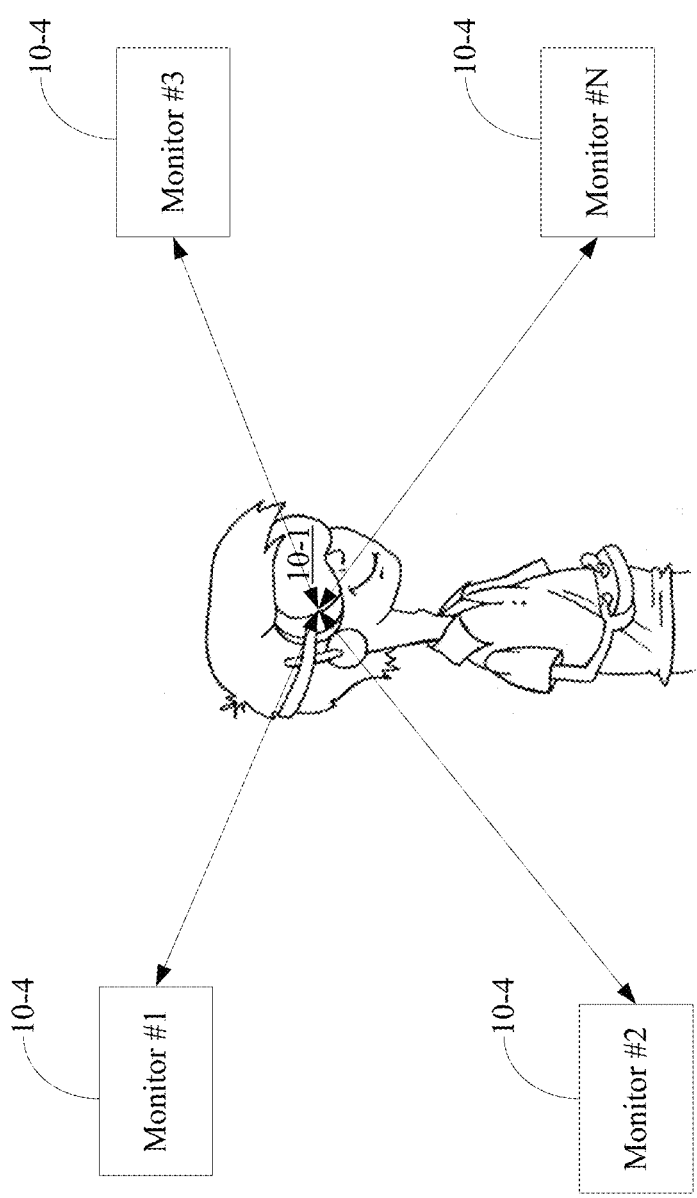
FIG. 2 is a schematic block diagram of a position tracking system of the virtual reality system according to some implementations of the present application.

In some implementations, the HMD 10-1 is configured to operate in a predefined space (e.g., 5×5 square meters) to determine the location (including position and orientation) of the HMD 10-1. To implement this position tracking feature, the HMD 10-1 has one or more sensors including a microelectromechanical systems (MEMS) gyroscope, accelerometer and laser position sensors, which are communicatively connected to a plurality of monitors located within a short distance from the HMD in different directions for determining its own position and orientation. FIG. 2 is a schematic block diagram of a position tracking system of the virtual reality system according to some implementations of the present application. In this example, four "lighthouse" base stations 10-4 are deployed at four different locations for tracking the user's movement with sub-millimeter precision. The position tracking system uses multiple photosensors on any object that needs to be captured. Two or more lighthouse stations sweep structured light lasers within the space in which the HMD 10-1 operates to avoid occlusion problems. One skilled in the art understands that there are other position tracking technologies that can be used for tracking the movement of the HMD 10-1, e.g., inertial tracking, acoustic tracking, magnetic tracking, etc.

Figure 3:
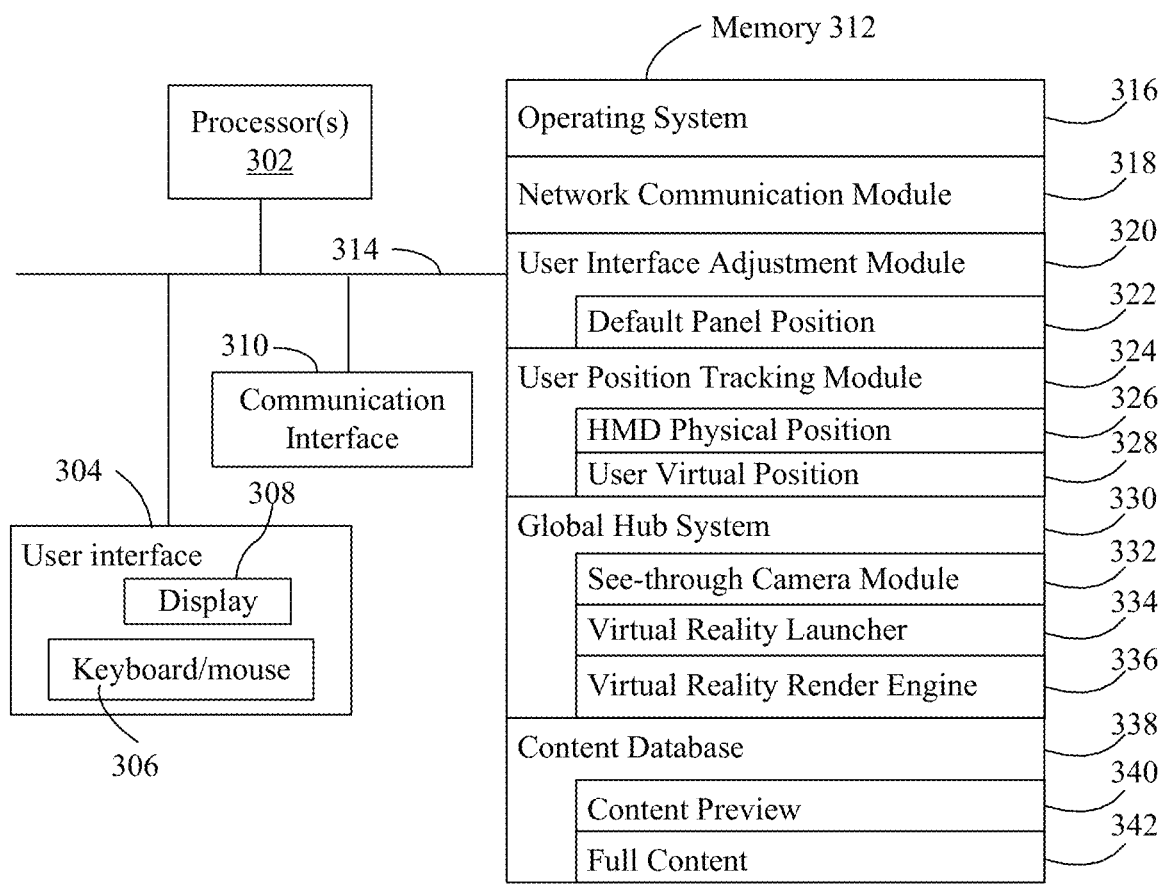
FIG. 3 is a schematic block diagram of different components of a computing system for implementing the virtual reality system according to some implementations of the present application.

FIG. 3 is a schematic block diagram of different components of a computing system 10 for implementing the virtual reality system according to some implementations of the present application. The computing system 10 includes one or more processors 302 for executing modules, programs and/or instructions stored in memory 312 and thereby performing predefined operations; one or more network or other communications interfaces 310; memory 312; and one or more communication buses 314 for interconnecting these components together and interconnecting the computing system 10 to the head-mounted display 10-1, the remote control 10-2, the position tracking system including multiple monitors 10-4, and various third-party devices. In some implementations, the computing system 300 includes a user interface 304 comprising a display device 308 and one or more input devices 306 (e.g., keyboard or mouse or touch screen). In some implementations, the memory 312 includes high-speed random access memory, such as DRAM, SRAM, or other random access solid state memory devices. In some implementations, memory 312 includes non-volatile memory, such as one or more magnetic disk storage devices, optical disk storage devices, flash memory devices, or other non-volatile solid state storage devices. In some implementations, memory 312 includes one or more storage devices remotely located from the processor(s) 302. Memory 312, or alternately one or more storage devices (e.g., one or more nonvolatile storage devices) within memory 312, includes a non-transitory computer readable storage medium. In some implementations, memory 312 or the computer readable storage medium of memory 312 stores the following programs, modules and data structures, or a subset thereof:

- an operating system 316 that includes procedures for handling various basic system services and for performing hardware dependent tasks;
- a network communications module 318 that is used for connecting the computing system 10 to other computing devices (e.g., the HMD 10-1, the remote control 10-2, and the third-party devices shown in FIG. 1 as well as the monitors 10-4 depicted in FIG. 2) via the communication network interfaces 310 and one or more communication networks (wired or wireless), such as the Internet, other wide area networks, local area networks, metropolitan area networks, etc.;
- a user interface adjustment module 320 for adjusting a user interface panel in the virtual reality environment generated by the virtual reality system, the user interface panel being similar to the home screen of a computer system or a mobile phone with which a user can interact and choose virtual content or applications to be rendered in the virtual space and, in some implementations, the user interface panel has a default position 322 defined by the virtual system, which is customized by the user interface adjust module 320 based on the user's position in the virtual space (which is determined by the virtual reality system according to the head-mounted display's physical position measured by the position tracking system);
- a user position tracking module 324 for determining the current location of the user in the virtual space defined by the virtual reality system and tracking the movement of the user in the virtual space, and in some implementations, the user's virtual position 328 in the virtual space is determined based on the head-mounted display's physical position 326 in the physical space as determined by the position tracking system, and in some implementations, a continuous tracking of the user's movement in the virtual space defines a movement pattern by the user for interpreting the user's intent;
- a global hub system 330 for switching the user's experience between the virtual world and the real world, the global hub system 330 including a see-through camera module 332 for activating, e.g., a see-through camera built into the head-mounted display 10-1 to project images captured by the camera onto the screen of the head-mounted display such that the user can quickly switch to the real world to handle certain matters without having to remove the head-mounted display from his/her head, a virtual reality launcher 334 for launching, e.g., the user interface panel in front of the user in the virtual space so that the user can choose one of the virtual content or applications for rendition using the virtual reality system, and a virtual reality render engine 336 for rendering the user-selected content or application in the virtual space; and
- a content database 338 for hosting various virtual content and applications to be visualized in the virtual space, and in some implementations, the content database 338 further includes a content preview 342 in connection with a full content 342 such that the user can visualize the content preview 342 in a more intuitive manner without activating the full content 342.

Having described the hardware of the virtual reality system and functionalities of some software running on the virtual reality system, the rest of this application is directed to three specific features of the virtual reality system that overcomes the issues found in today's virtual reality applications.

Figure 4A:
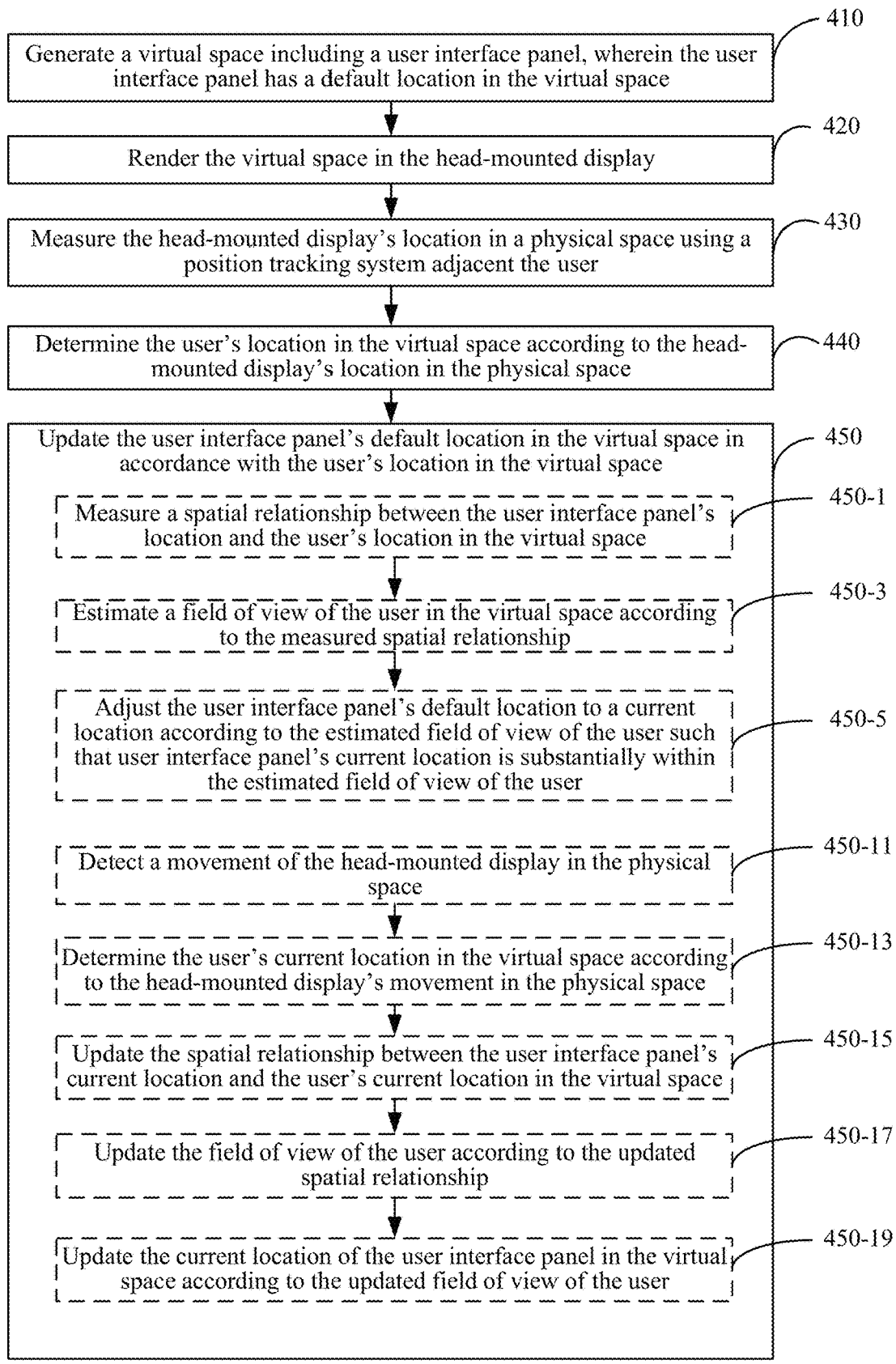
FIGS. 4A and 4B depict a process performed by the virtual reality system for customizing a user interface panel of a virtual space based on user locations according to some implementations of the present application.
Figure 4B:
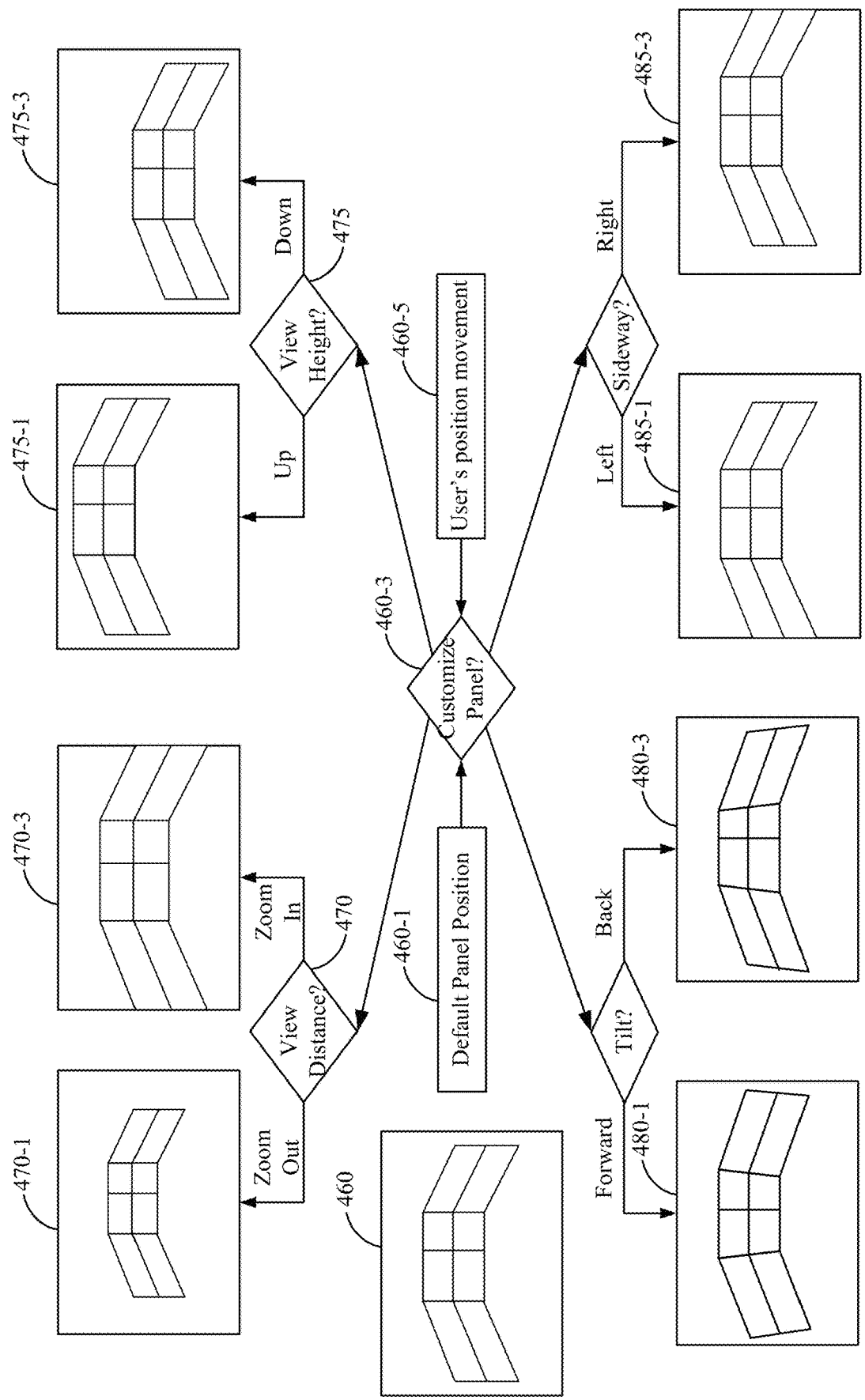

In particular, FIGS. 4A and 4B depict a process performed by the virtual reality system for customizing a user interface panel of a virtual space based on user locations according to some implementations of the present application. Because different users have different heights, different head shapes, different eyesight and different habits when watching the same subject, there is no guarantee that the default position and orientation of the user interface panel of the same HMD is a good fit for different users. According to the process shown in FIG. 4A, the virtual reality system customizes the user interface panel's location to achieve optimized locations for different users automatically without any explicit user input or semi-automatically based on use's response.

As shown in FIG. 4A, the computing system first generates (410) a virtual space for the virtual reality system. This virtual space includes a user interface panel having a default location in the virtual space. Next, the computing system renders (420) the virtual space in the head-mounted display. In some implementations, the default location is determined based on an average person's height, head size, and eyesight. As noted above, the default location may not be an optimized location for a particular user wearing the head-mounted display.

To find the optimized location for the particular user, the computing system measures (430) the head-mounted display's location in a physical space using a position tracking system adjacent the user. As noted above in connection with FIG. 2, the position tracking system defines a physical space and measures the movement of the head-mounted display (or more specifically, the sensors in the head-mounted display) within the physical space.

After measuring the physical location, the computing system determines (440) the user's location in the virtual space according to the head-mounted display's location in the physical space. Next, the computing system updates (450) the user interface panel's default location in the virtual space in accordance with the user's location in the virtual space. Because the computing system has taken into account of the user's actual size and height, the updated location of the user interface panel can be a better fit for the particular user than the default one.

In some implementations, the computing system updates the user interface panel's location by measuring (450-1) a spatial relationship between the user interface panel's location and the user's location in the virtual space and then estimating (450-3) a field of view of the user in the virtual space according to the measured spatial relationship. Next the computing system adjusts (450-5) the user interface panel's default location to a current location according to the estimated field of view of the user such that user interface panel's current location is substantially within the estimated field of view of the user.

In some implementations, the computing system uses the position tracking system to detect (450-11) a movement of the head-mounted display in the physical space and then determines (450-13) the user's current location in the virtual space according to the head-mounted display's movement in the physical space. To do so, the virtual reality system establishes a mapping relationship between the physical space and the virtual space, the mapping relationship including one or more of a translation and relationship of the coordinate system from the physical space to the virtual space. Next the computing system updates (450-15) the spatial relationship between the user interface panel's current location and the user's current location in the virtual space, updates (450-17) the field of view of the user according to the updated spatial relationship, and updates (450-19) the current location of the user interface panel in the virtual space according to the updated field of view of the user. In some implementations, the computing system may perform the process repeatedly until an optimized location of the user interface panel is found.

In some implementations, the distance of the current location of the user interface panel relative to the user in the virtual space is updated according to the updated field of view of the user. In some implementations, the orientation of the user interface panel relative to the user in the virtual space is updated according to the updated field of view of the user. In some implementations, the computing system detects a movement of the head-mounted display in the physical space by measuring a direction of the movement of the head-mounted display in the physical space, a magnitude of the movement of the head-mounted display in the physical space, a trace of the movement of the head-mounted display in the physical space, and/or a frequency of the movement of the head-mounted display in the physical space.

FIG. 4B depicts different scenarios of how the user interface panel is customized 460-3 to find an optimized location. When the user puts on the head-mounted display and starts interacting with the user interface panel 460 having a default user panel location 460-1 in the virtual reality system, the virtual reality system monitors the user's movement 460-5. For example, if the default location is too close to the user, the user may consciously or subconsciously move back or lean back to increase the distance to the user interface panel. Conversely, if the user feels that the user interface panel is too far away, the user may move forward or lean forward to reduce the distance to the user interface panel. In accordance with a detection of a corresponding user movement, the computing system may increase 470-1 the distance between the user and the user interface panel or decrease 470-3 the distance between the user and the user interface panel.

Similarly, when the user raises his head or lowers his head while wearing the head-mounted display, the computing system may adjust the height of the user interface panel by lifting 475-1 the user interface panel upward or pushing 475-3 the user interface panel downward to accommodate the user's location and preference. When the user wearing the head-mounted display tilts his head forward or back, the computing system may tilt the user interface panel forward 480-1 or back 480-3. When the user wearing the head-mounted display rotates his head toward the left or right, the computing system may slide the user interface panel sideway to left 485-1 or right 485-3. In some implementations, the magnitude of the user panel location's adjustment is proportional to the user's head movement. In some other implementations, the magnitude of the user panel location's adjustment triggered by each user's head movement is constant and the computing system adjusts the user interface's location multiple times, each by a constant movement, based on the frequency of the user's head movement.

Figure 5A:
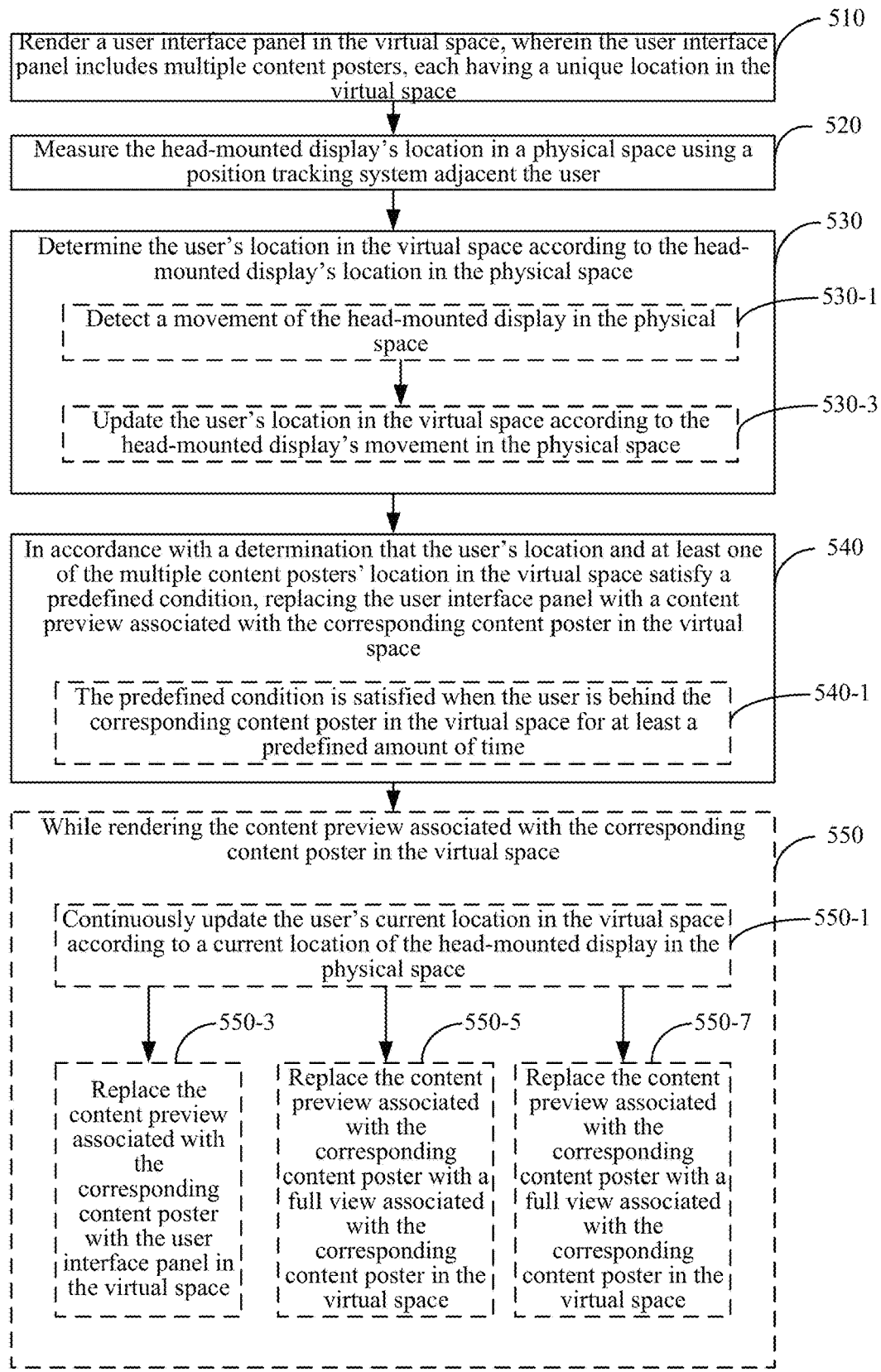
FIGS. 5A and 5B depict a process performed by the virtual reality system for rendering a content preview in a virtual space based on user locations according to some implementations of the present application.
Figure 5B:
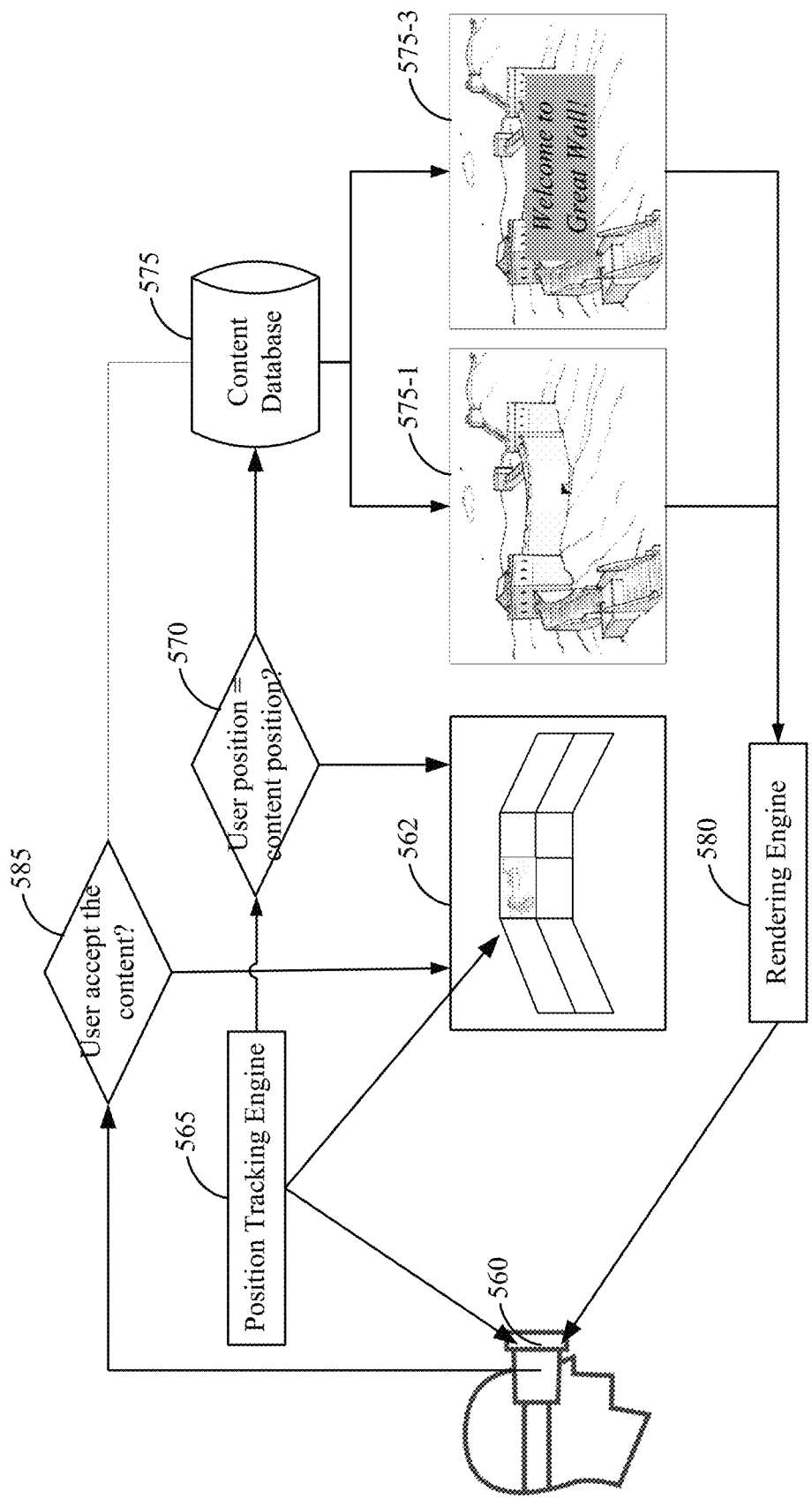

FIGS. 5A and 5B depict a process performed by the virtual reality system for rendering a content preview in a virtual space based on the user's locations according to some implementations of the present application. This process detects the user's true intent based on the user's location and movement and acts accordingly without necessarily requiring an explicit action by the user, e.g., pressing a certain button on the remote control 10-2.

First, the computing system renders (510) a user interface panel in the virtual space. As shown in FIG. 5B, the user interface panel 562 includes multiple content posters, each having a unique location in the virtual space. Next the computing system measures (520) the head-mounted display's location in a physical space using a position tracking system adjacent the user and determines (530) the user's location in the virtual space according to the head-mounted display's location in the physical space. As shown in FIG. 5B, the position tracking engine 565 measures the head-mounted display's location 560 and converts it into the user's location in the virtual space relative to the user interface panel 562. In accordance with a determination that the user's location and at least one of the multiple content posters' location in the virtual space satisfy a predefined condition, the computing system replaces (540) the user interface panel with a content preview associated with the corresponding content poster in the virtual space. For example, as shown in FIG. 5B, when the user's location in the virtual space is determined to be the same as the location of the Great Wall poster in the virtual space 570, the rending engine 580 retrieves the content preview 575-1 of the Great Wall from the content database 575 and renders the content preview in the head-mounted display 560.

In some implementations, the predefined condition is satisfied (540-1) when the user is behind the corresponding content poster in the virtual space for at least a predefined amount of time. In some other implementations, the predefined condition is no longer satisfied when the user exists from the corresponding content poster in the virtual space for at least a predefined amount of time. In some implementations, the computing system detects (530-1) a movement of the head-mounted display in the physical space and updates (530-3) the user's location in the virtual space according to the head-mounted display's movement in the physical space.

In some implementations, while rendering the content preview associated with the corresponding content poster in the virtual space, the computing system continuously updates (550-1) the user's current location in the virtual space according to a current location of the head-mounted display in the physical space. As a result, in accordance with a determination that the user's current location and the corresponding content poster's location in the virtual space no longer satisfy the predefined condition, the computing system replaces (550-3) the content preview associated with the corresponding content poster with the user interface panel in the virtual space. In some other implementations, in accordance with a determination that the user's current location and the corresponding content poster's location in the virtual space satisfy the predefined condition for at least a predefined amount of time, the computing system replaces (550-5) the content preview associated with the corresponding content poster with a full view associated with the corresponding content poster in the virtual space. In yet some other implementations, in accordance with a determination that the user's movement in the virtual space satisfies a predefined movement pattern, the computing system replaces (550-7) the content preview associated with the corresponding content poster with a full view associated with the corresponding content poster in the virtual space. As shown in FIG. 5B, it is assumed that the user has accepted 585 to access the full view of the Great Wall content (e.g., when one of the two conditions described above is met), the rendering engine 580 of the virtual reality system then retrieves the full view of the Great Wall content and renders it in the head-mounted display 560.

Figure 6A:
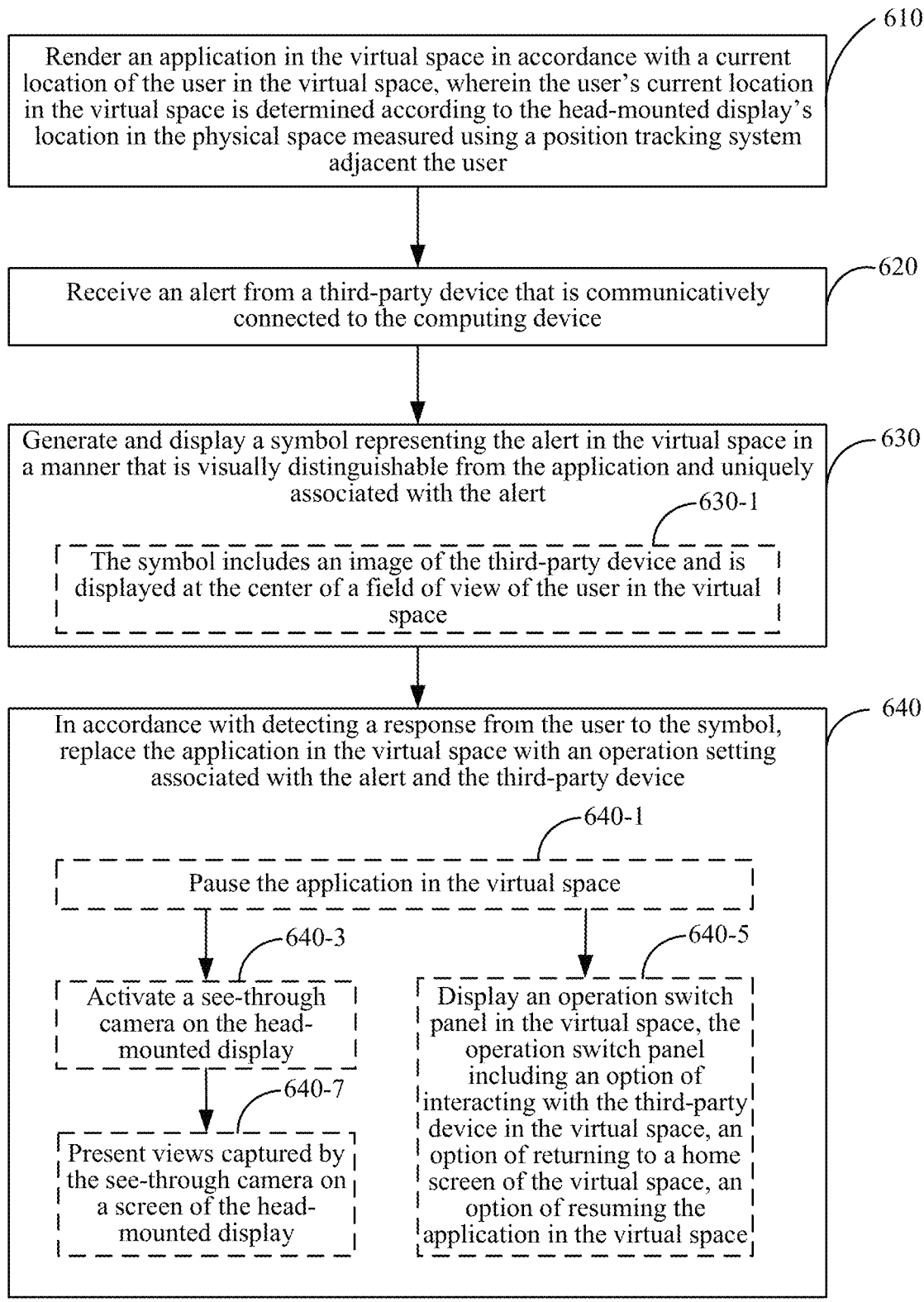
FIGS. 6A and 6B depict a process performed by the virtual reality system for updating an operation setting of a virtual space according to some implementations of the present application.
Figure 6B:
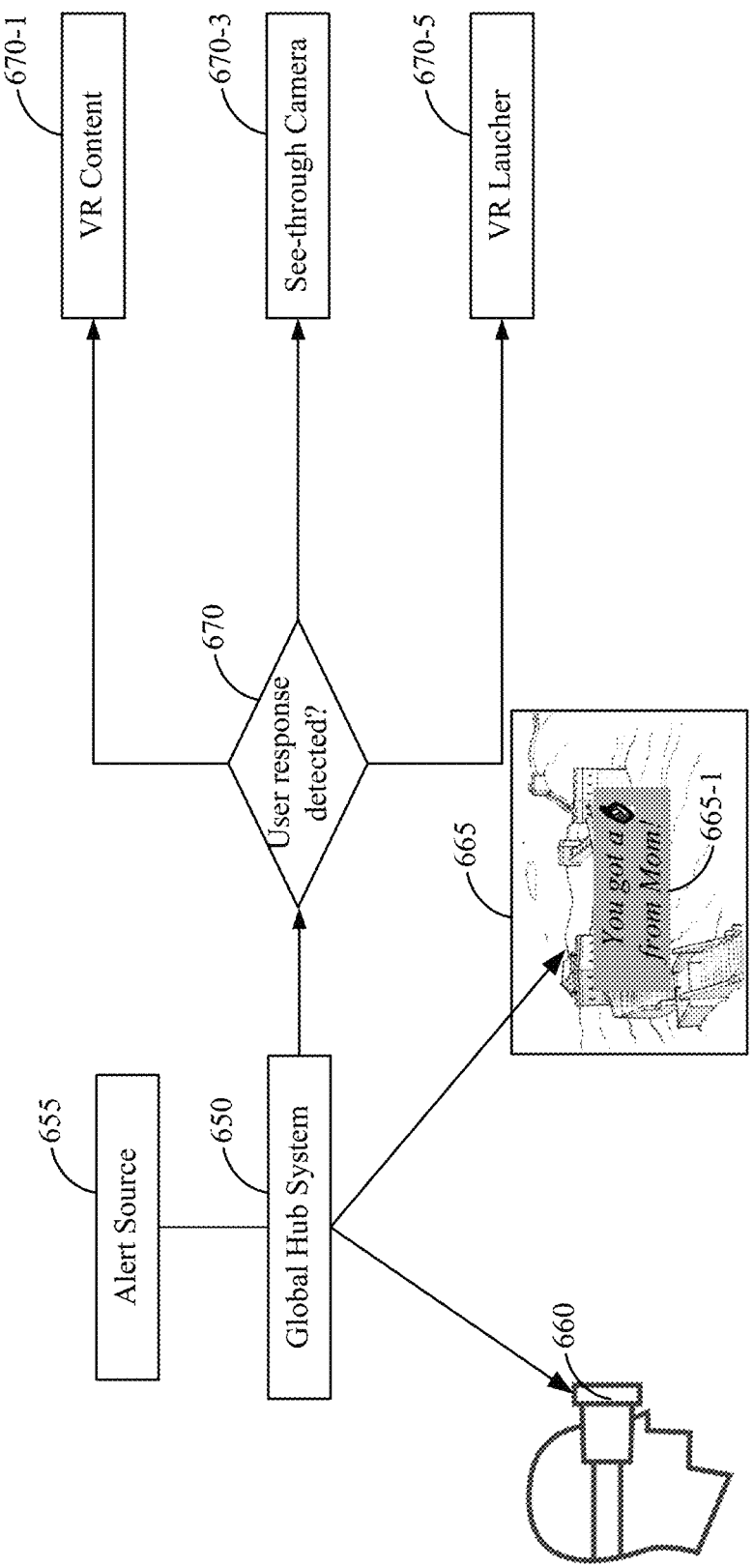

FIGS. 6A and 6B depict a process performed by the virtual reality system for updating an operation setting of a virtual space according to some implementations of the present application. This process addresses the issue of how to "interrupt" the user's immersive experience in the virtual world when there is a message or alert from a third-party device arriving at the virtual reality system.

First, the computing system renders (610) an application in the virtual space in accordance with a current location of the user in the virtual space. As described above, the user's current location in the virtual space is determined according to the head-mounted display's location in the physical space measured using a position tracking system adjacent the user.

Next, the computing system receives (620) an alert from a third-party device that is communicatively connected to the computing system. As described above in connection with FIG. 1, the third-party device may be a mobile phone or a home appliance or an IOT device that is connected to the computing system 10 via a short-range wireless connection. As shown in FIG. 6B, while the user is interacting with the virtual content 665 via the head-mounted display 660, the global hub system 650 of the virtual reality system receives an alert from a mobile phone that is connected to the virtual reality system.

In response, the computing system generates (630) and displays a symbol representing the alert in the virtual space in a manner that is visually distinguishable from the application and uniquely associated with the alert. In some implementations, the symbol includes (630-1) an image of the third-party device and is displayed at the center of a field of view of the user in the virtual space. For example, the third-party device may be a mobile phone that is commu-nicatively connected to the computing system and the alert corresponds to one selected from the group consisting of receiving a new call from another person at the mobile phone, receiving a new message from another person at the mobile phone, receiving an appointment reminder at the mobile phone. As shown in FIG. 6B, a text message 665-1 is displayed at the center of the virtual content 665 indicating that there is an incoming call to the user from his mother.

Next, in accordance with detecting a response from the user to the symbol, the computing system replaces (640) the application in the virtual space with an operation setting associated with the alert and the third-party device. In some implementations, the response indicates that the user is going to answer the alert. Accordingly, the computing system pauses (640-1) the application in the virtual space, activates (640-3) a see-through camera on the head-mounted display, and presents (640-7) views captured by the see-through camera on a screen of the head-mounted display.

In some other implementations, the first response indicates that the user is likely to answer the alert. In this case, the computing system pauses (640-1) the application in the virtual space and displays (640-5) an operation switch panel in the virtual space, the operation switch panel including an option of interacting with the third-party device in the virtual space, an option of returning to a home screen of the virtual space, an option of resuming the application in the virtual space. As shown in FIG. 6B, the see-through camera 670-3 allows the user to respond to the incoming call without having to remove the head-mounted display 660 from his head. As shown in FIG. 6B, after detecting the user's response 670, the global hub system 650 presents three options to the user, including rendering the virtual reality content 670-1, turning on the see-through camera 670-3 in the head-mounted display 660, allowing the user to respond to the incoming call without having to remove the head-mounted display 660 from his head, or activating the virtual reality launcher 670-5.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of customizing a user interface panel of a virtual space based on user locations, the method, performed at a computing system having one or more processors, memory for storing programs to be executed by the one or more processors, wherein the computing system is communicatively connected to a head-mounted display configured to be worn by a user, comprising:
    generating a virtual space including a user interface panel, wherein the user interface panel has a default location in the virtual space, and the user interface panel includes multiple content posters, each having a unique location in the virtual space;
    rendering the virtual space in the head-mounted display;
    measuring the head-mounted display's location in a physical space using a position tracking system adjacent the user;
    determining the user's location in the virtual space according to the head-mounted display's location in the physical space;
    updating the user interface panel's default location in the virtual space in accordance with the user's location in the virtual space;
    detecting a movement of the head-mounted display in the physical space;
    determining the user's current location in the virtual space according to the head-mounted display's movement in the physical space;
    updating a spatial relationship between the user interface panel's current location and the user's current location in the virtual space;
    updating a field of view of the user according to the updated spatial relationship;
    updating the current location of the user interface panel in the virtual space according to the updated field of view of the user;
    rendering a content preview associated with a corresponding content poster in the virtual space based on the user's current location and the current location of the user interface panel.

2. The method according to claim 1, wherein the operation of updating the user interface panel's default location in the virtual space in accordance with the user's location in the virtual space further comprises:
    measuring the spatial relationship between the user interface panel's location and the user's location in the virtual space;
    estimating the field of view of the user in the virtual space according to the measured spatial relationship; and
    adjusting the user interface panel's default location to a current location according to the estimated field of view of the user such that user interface panel's current location is substantially within the estimated field of view of the user.

3. The method according to claim 1 wherein the operation of updating the current location of the user interface panel in the virtual space according to the updated field of view of the user further includes updating a distance between the user interface panel and the user in the virtual space.

4. The method according to claim 1 wherein the operation of updating the current location of the user interface panel in the virtual space according to the updated field of view of the user further includes updating an orientation of the user interface panel relative to the user in the virtual space.

5. The method according to claim 1 wherein the operation of detecting a movement of the head-mounted display in the physical space further includes measuring a direction of the movement of the head-mounted display in the physical space.

6. The method according to claim 1, wherein the operation of detecting a movement of the head-mounted display in the physical space further includes measuring a magnitude of the movement of the head-mounted display in the physical space.

7. The method according to claim 1, wherein the operation of detecting a movement of the head-mounted display in the physical space further includes measuring a trace of the movement of the head-mounted display in the physical space.

8. The method according to claim 1, wherein the operation of detecting a movement of the head-mounted display in the physical space further includes measuring a frequency of the movement of the head-mounted display in the physical space.

9. The method according to claim 1, wherein the location of the user interface panel in the virtual space includes a position and an orientation of the user interface panel in the virtual space.

10. The method according to claim 1, wherein the position tracking system includes a plurality of monitors and the head-mounted display includes one or more sensors that communicate with the plurality of monitors for determining the head-mounted display's location in the physical space.

11. The method according to claim 1, further comprising displaying, in the virtual space, an icon representing an alert that is received from a device communicatively connected to the head-mounted display, wherein the icon is visually distinguishable from the user interface panel.

12. The method according to claim 1, further comprising, in accordance with a determination that the user's location and at least one of the multiple content posters' location in the virtual space satisfies a predefined condition, replacing the user interface panel with a content preview associated with the corresponding content poster in the virtual space, wherein the predefined condition corresponds to the user being behind the corresponding content poster for at least a predefined amount of time.

13. A computing system for customizing a user interface panel of a virtual space based on user locations, wherein the computing system is communicatively connected to a head-mounted display configured to be worn by a user, the computing system comprising:
  one or more processors;
  memory; and
  a plurality of programs stored in the memory, wherein the plurality of programs, when executed by the one or more processors, cause the computing system to perform one or more operations including:
    generating a virtual space including a user interface panel, wherein the user interface panel has a default location in the virtual space, and the user interface panel includes multiple content posters, each having a unique location in the virtual space;
    rendering the virtual space in the head-mounted display;
    measuring the head-mounted display's location in a physical space using a position tracking system adjacent the user;
    determining the user's location in the virtual space according to the head-mounted display's location in the physical space;
    updating the user interface panel's default location in the virtual space in accordance with the user's location in the virtual space,
    detecting a movement of the head-mounted display in the physical space;
    determining the user's current location in the virtual space according to the head-mounted display's movement in the physical space;
    updating the spatial relationship between the user interface panel's current location and the user's current location in the virtual space;
    updating the field of view of the user according to the updated spatial relationship; and
    updating the current location of the user interface panel in the virtual space according to the updated field of view of the user.

14. The computing system according to claim 13, wherein the operation of updating the user interface panel's default location in the virtual space in accordance with the user's location in the virtual space further comprises operations for:
  measuring the spatial relationship between the user interface panel's location and the user's location in the virtual space;
  estimating the field of view of the user in the virtual space according to the measured spatial relationship; and
  adjusting the user interface panel's default location to a current location according to the estimated field of view of the user such that user interface panel's current location is substantially within the estimated field of view of the user.

15. The computing system according to claim 13, wherein the location of the user interface panel in the virtual space includes a position and an orientation of the user interface panel in the virtual space.

16. The computing system according to claim 13, wherein the position tracking system includes a plurality of monitors and the head-mounted display includes one or more sensors that communicate with the plurality of monitors for determining the head-mounted display's location in the physical space.

17. A non-transitory computer readable storage medium in connection with a computing system having one or more processors for customizing a user interface panel of a virtual space based on user locations, wherein the computing system is communicatively connected to a head-mounted display configured to be worn by a user, and the non-transitory computer readable storage medium stores a plurality of programs that, when executed by the one or more processors, cause the computing system to perform one or more operations including:
  generating a virtual space including a user interface panel, wherein the user interface panel has a default location in the virtual space, and the user interface panel includes multiple content posters, each having a unique location in the virtual space;
  rendering the virtual space in the head-mounted display;
  measuring the head-mounted display's location in a physical space using a position tracking system adjacent the user;
  determining the user's location in the virtual space according to the head-mounted display's location in the physical space;
  updating the user interface panel's default location in the virtual space in accordance with the user's location in the virtual space;
    detecting a movement of the head-mounted display in the physical space;
    determining the user's current location in the virtual space according to the head-mounted display's movement in the physical space;
    updating a spatial relationship between the user interface panel's current location and the user's current location in the virtual space;
    updating a field of view of the user according to the updated spatial relationship;
    updating the current location of the user interface panel in the virtual space according to the updated field of view of the user;
    rendering a content preview associated with a corresponding content poster in the virtual space based on the user's current location and the current location of the user interface panel.

18. The non-transitory computer readable storage medium according to claim 17, wherein the operation of updating the user interface panel's default location in the virtual space in accordance with the user's location in the virtual space further comprises operations for:
- measuring the spatial relationship between the user interface panel's location and the user's location in the virtual space;
- estimating the field of view of the user in the virtual space according to the measured spatial relationship; and
- adjusting the user interface panel's default location to a current location according to the estimated field of view of the user such that user interface panel's current location is substantially within the estimated field of view of the user.

19. The non-transitory computer readable storage medium according to claim 17, wherein the location of the user interface panel in the virtual space includes a position and an orientation of the user interface panel in the virtual space.

20. The non-transitory computer readable storage medium according to claim 17, wherein the position tracking system includes a plurality of monitors and the head-mounted display includes one or more sensors that communicate with the plurality of monitors for determining the head-mounted display's location in the physical space.

* * * * *